United States Patent
Rakowski et al.

(10) Patent No.: US 11,630,335 B2
(45) Date of Patent: Apr. 18, 2023

(54) OPTICAL POWER MODULATORS WITH UNLOADED TRANSMISSION LINES

(71) Applicant: GLOBALFOUNDRIES U.S. Inc., Santa Clara, CA (US)

(72) Inventors: Michal Rakowski, Ballston Lake, NY (US); Abdelsalam Aboketaf, Essex Junction, VT (US); Kevin K. Dezfulian, Arlington, VA (US); Massimo Sorbara, Freehold, NJ (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 132 days.

(21) Appl. No.: 17/170,237

(22) Filed: Feb. 8, 2021

(65) Prior Publication Data

US 2022/0252910 A1 Aug. 11, 2022

(51) Int. Cl.
*G02F 1/025* (2006.01)
*G02F 1/225* (2006.01)

(52) U.S. Cl.
CPC .......... *G02F 1/025* (2013.01); *G02F 1/2255* (2013.01); *G02F 1/2257* (2013.01); *G02F 2201/127* (2013.01)

(58) Field of Classification Search
CPC .......... G02F 1/025; G02F 1/035; G02F 1/225
USPC ....................................................... 385/1–3
See application file for complete search history.

(56) References Cited

U.S. PATENT DOCUMENTS

| 4,843,350 | A * | 6/1989 | Nazarathy | G02F 1/2255 385/3 |
|---|---|---|---|---|
| 11,467,467 | B2 * | 10/2022 | Ozaki | G02F 1/025 |
| 2014/0241659 | A1 * | 8/2014 | Fukuda | G02F 1/2257 385/3 |
| 2016/0062207 | A1 * | 3/2016 | Bai | G02F 1/2257 385/3 |
| 2016/0085133 | A1 * | 3/2016 | Denoyer | G02F 1/2257 385/3 |

(Continued)

OTHER PUBLICATIONS

G. L. Li, T. G. B. Mason, and P. K. L. Yu, "Analysis of Segmented Traveling-Wave Optical Modulators," J. Lightwave Technol. 22, 1789—(2004).

(Continued)

*Primary Examiner* — Robert Tavlykaev
(74) *Attorney, Agent, or Firm* — Thompson Hine LLP; Anthony Canale (57) ABSTRACT

Structures for an optical power modulator and methods of fabricating a structure for an optical power modulator. A first waveguide core includes first and second sections. A second waveguide core includes a first section laterally adjacent to the first section of the first waveguide core and a second section laterally adjacent to the second section of the first waveguide core. An interconnect structure is formed over the first waveguide core and the second waveguide core. The interconnect structure includes first and second transmission lines. The first transmission line is physically connected within the interconnect structure to the first section of the first waveguide core. The second transmission line includes a first section physically connected within the interconnect structure to the second section of the first waveguide core and a second section adjacent to the first transmission line.

18 Claims, 10 Drawing Sheets

(56) References Cited

U.S. PATENT DOCUMENTS

2021/0080796 A1* 3/2021 Kissa .................. G02F 1/0356
2021/0080797 A1* 3/2021 Kissa .................. G02F 1/011

OTHER PUBLICATIONS

H. Chen, Y. Kuo and J. E. Bowers, "A high speed Mach-Zehnder silicon evanescent modulator using capacitively loaded traveling wave electrode," 2009 6th IEEE International Conference on Group IV Photonics, San Francisco, CA, 2009, pp. 247-249.

D. Petousi et al., "Monolithic photonic BiCMOS sub-system comprising MZM and segmented driver with 13 dB ER at 28 Gb/s," 2016 Conference on Lasers and Electro-Optics (CLEO), San Jose, CA, 2016, pp. 1-2.

K. Zhu, V. Saxena, X. Wu and W. Kuang, "Design Considerations for Traveling-Wave Modulator-Based CMOS Photonic Transmitters," in IEEE Transactions on Circuits and Systems II: Express Briefs, vol. 62, No. 4, pp. 412-416, Apr. 2015.

Laurens Breyne, Hannes Ramon, Kasper Van Gasse, Michiel Verplaetse, Joris Lambrecht, Michael Vanhoecke, Joris Van Campenhout, Günther Roelkens, Peter Ossieur, Xin Yin, and Johan Bauwelinck, "50 GBd PAM4 transmitter with a 55nm SiGe BiCMOS driver and silicon photonic segmented MZM," Opt. Express 28, 23950-23960 (2020).

N. Hosseinzadeh, K. Fang, L. Valenzuela, C. Schow and J. F. Buckwalter, "A 50-Gb/s Optical Transmitter Based on Co-design of a 45-nm CMOS SOI Distributed Driver and 90-nm Silicon Photonic Mach-Zehnder Modulator," 2020 IEEE/MTT-S International Microwave Symposium (IMS), Los Angeles, CA, USA, 2020, pp. 205-208.

David Patel, Samir Ghosh, Mathieu Chagnon, Alireza Samani, Venkat Veerasubramanian, Mohamed Osman, and David V. Plant, "Design, analysis, and transmission system performance of a 41 GHz silicon photonic modulator," Opt. Express 23, 14263-14287 (2015).

* cited by examiner

OPTICAL POWER MODULATORS WITH UNLOADED TRANSMISSION LINES

BACKGROUND

The present invention relates to photonics chips and, more specifically, to structures for an optical power modulator and methods of fabricating a structure for an optical power modulator.

Photonics chips are used in many applications and systems including, but not limited to, data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An electro-optic modulator can be used as an optical switch to modulate the amplitude or phase of an optical signal under the control of an electrical signal. The modulation can be utilized to convert a continuous optical signal into an encoded data stream containing binary data. One type of optical switch is a Mach-Zehnder interferometer (MZI) modulator that is realized in a silicon photonics technology. A disadvantage of this type of optical switch is that silicon exhibits a weak electro-optic or free-carrier dispersion effect. For that reason, MZI modulators are characterized by a large form factor having lengthy silicon-based phase shifters that are arranged in dual arms. Limitations on the bandwidth of the long transmission lines associated with such lengthy silicon-based phase shifters may adversely impact the performance of MZI modulators.

Improved structures for an optical power modulator and methods of fabricating a structure for an optical power modulator are needed.

SUMMARY

In an embodiment of the invention, a structure for an optical power modulator is provided. The structure includes a first waveguide core having a first section and a second section. The structure further includes a second waveguide core having a first section laterally adjacent to the first section of the first waveguide core and a second section laterally adjacent to the second section of the first waveguide core. The structure further includes an interconnect structure over the first waveguide core and the second waveguide core. The interconnect structure includes a first transmission line and a second transmission line. The first transmission line is physically connected within the interconnect structure to the first section of the first waveguide core. The second transmission line includes a first section physically connected within the interconnect structure to the second section of the first waveguide core and a second section adjacent to the first transmission line.

In an embodiment of the invention, a method of forming a structure for an optical power modulator is provided. The method includes forming a first waveguide core having a first section and a second section, forming a second waveguide core including a first section laterally adjacent to the first section of the first waveguide core and a second section laterally adjacent to the second section of the first waveguide core, and forming an interconnect structure over the first waveguide core and the second waveguide core. The interconnect structure includes a first transmission line that is physically connected within the interconnect structure to the first section of the first waveguide core, and a second transmission line that includes a first section physically connected within the interconnect structure to the second section of the first waveguide core and a second section adjacent to the first transmission line.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
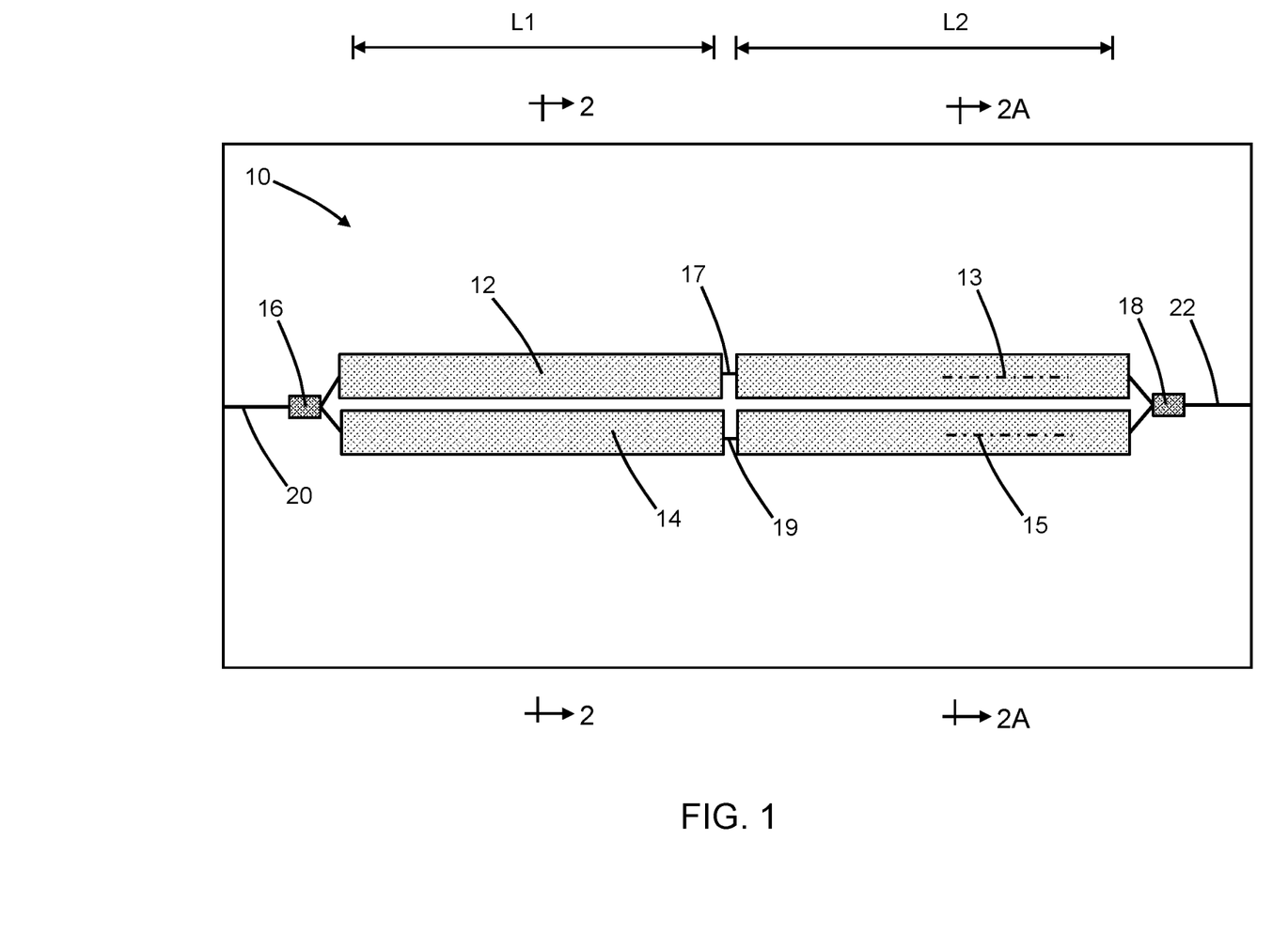
FIG. 1 is a top view of a structure at an initial fabrication stage of a processing method in accordance with embodiments of the invention.
Figure 2:
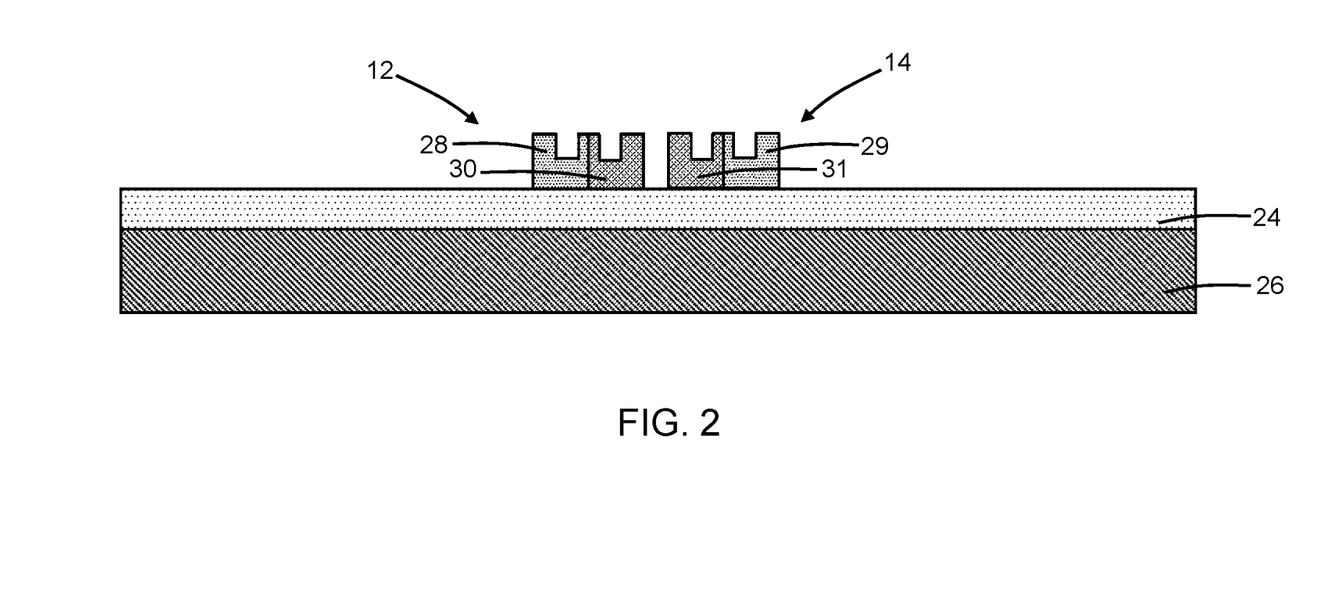
FIG. 2 is a cross-sectional view of the structure taken generally along line 2-2 in FIG. 1.
Figure 2A:
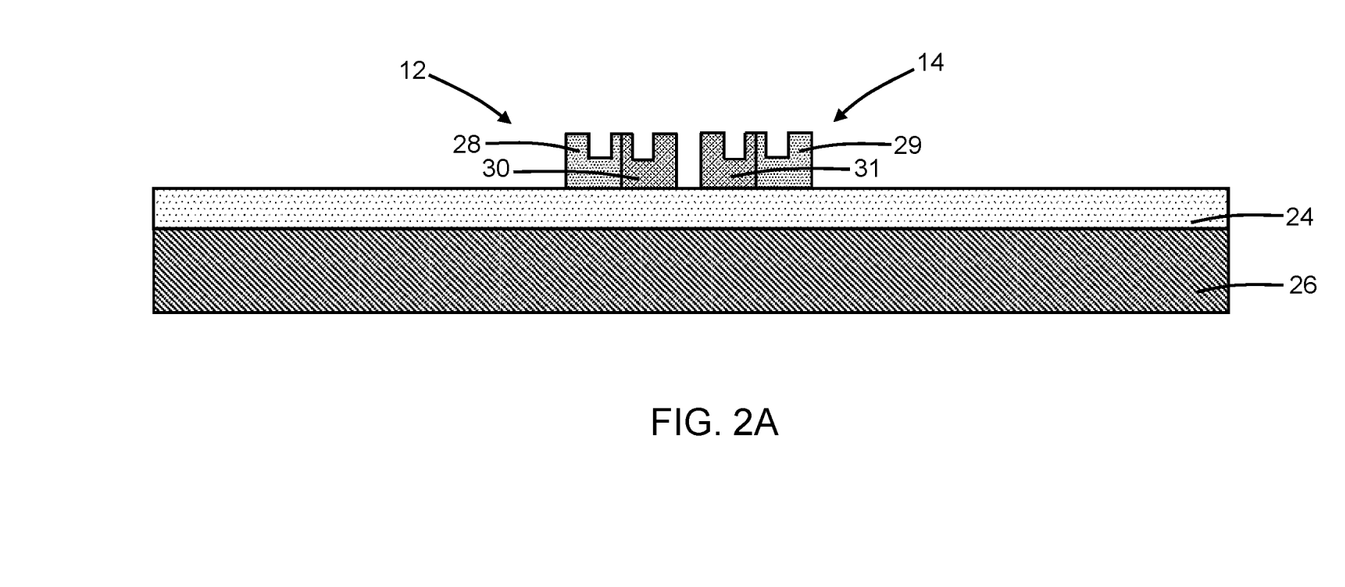
FIG. 2A is a cross-sectional view of the structure taken generally along line 2A-2A in FIG. 1.

With reference to FIGS. 1, 2, 2A and in accordance with embodiments of the invention, a structure 10 for an optical power modulator includes waveguide cores 12, 14, an optical splitter 16 coupling a routing waveguide core 20 to the waveguide cores 12, 14 at an input port, and an optical combiner 18 coupling a routing waveguide core 22 to the waveguide cores 12, 14 at an output port. The optical splitter 16 and the optical combiner 18 may include multimode interference regions that are configured to provide a desired coupling ratio, such as a 50%-50% coupling ratio, at the output port. The waveguide cores 12, 14 are laterally spaced apart to provide a gap that separates the waveguide core 12 from the waveguide core 14. The waveguide core 12 is aligned along a longitudinal axis 13, and the waveguide core 14 is aligned along a longitudinal axis 15 that may be oriented parallel or substantially parallel to the longitudinal axis 13.

The waveguide cores 12, 14 may define a phase shifter of the structure 10. In that regard, the waveguide core 12 may include a doped region 28 and a doped region 30 of opposite conductivity types that adjoin along a p-n junction, and the waveguide core 14 may also include a doped region 29 and a doped region 31 of opposite conductivity types that adjoin along a p-n junction. The doped regions 28, 29 may be concurrently formed in the waveguide cores 12, 14 by a masked ion implantation process, and the doped regions 30, 31 may be concurrently formed in the waveguide cores 12, 14 by a separate masked ion implantation process. In an embodiment, the semiconductor material of the doped regions 28, 29 may be doped with a p-type dopant (e.g., boron) that provides p-type electrical conductivity, and the semiconductor material of the doped regions 30, 31 may be doped with an n-type dopant (e.g., arsenic) that provides n-type electrical conductivity. Heavily-doped regions (not shown) of reduced electrical resistance may be formed in portions of the doped regions 28, 29 and in portions of the doped regions 30, 31 and used to establish electrical contacts for biasing the p-n junction.

The waveguide cores 12, 14 may be divided into segments or sections characterized by individual lengths L1 and L2 that sum to equal a total length over a modulated portion of the phase shifter. The section of the waveguide core 12 with the length L1 is positioned laterally adjacent to the section of the waveguide core 14 with the length L1. The section of the waveguide core 12 with the length L2 is positioned laterally adjacent to the section of the waveguide core 14 with the length L2. In an embodiment, the length L1 may be equal to the length L2. In an embodiment, the length L1 may be substantially equal to the length L2. In an embodiment, the length L1 and the length L2 may each be substantially equal to 1 millimeter. The sections of the waveguide core 12 may be connected by an intervening waveguide section 17 that defines a transition between the different sections, and sections of the waveguide core 14 may be connected by an intervening waveguide section 19 that defines a transition between the different sections. The different sections of the waveguide core 12 each include the doped regions 28, 30, and the different sections of the waveguide core 14 each include the doped regions 29, 31.

The section of the waveguide core 12 with the length L1 is positioned physically closer to the optical splitter 16 than the section of the waveguide core 12 with the length L2. Hence, the split light is guided to propagate through the section of the waveguide core 12 with the length L1 before propagating through the section of the waveguide core 12 with the length L2. The section of the waveguide core 14 with the length L1 is positioned physically closer to the optical splitter 16 than the section of the waveguide core 14 with the length L2. Hence, the split light is guided to propagate through the section of the waveguide core 14 with the length L1 before propagating through the section of the waveguide core 14 with the length L2.

The waveguide cores 12, 14, the optical splitter 16, the optical combiner 18, and the routing waveguide cores 20, 22 may be comprised of a single-crystal semiconductor material, such as single-crystal silicon. In an embodiment, the single-crystal semiconductor material may originate from a device layer of a silicon-on-insulator (SOI) substrate that further includes a dielectric layer 24 provided by a buried oxide layer and a substrate 26 comprised of a single-crystal semiconductor material, such as single-crystal silicon. The waveguide cores 12, 14, the optical splitter 16, the optical combiner 18, and the routing waveguide cores 20, 22 may be patterned from the device layer by lithography and etching processes during front-end-of-line processing. The waveguide cores 12, 14, the optical splitter 16, the optical combiner 18, and the routing waveguide cores 20, 22 may directly contact the dielectric layer 24.

Figure 3:
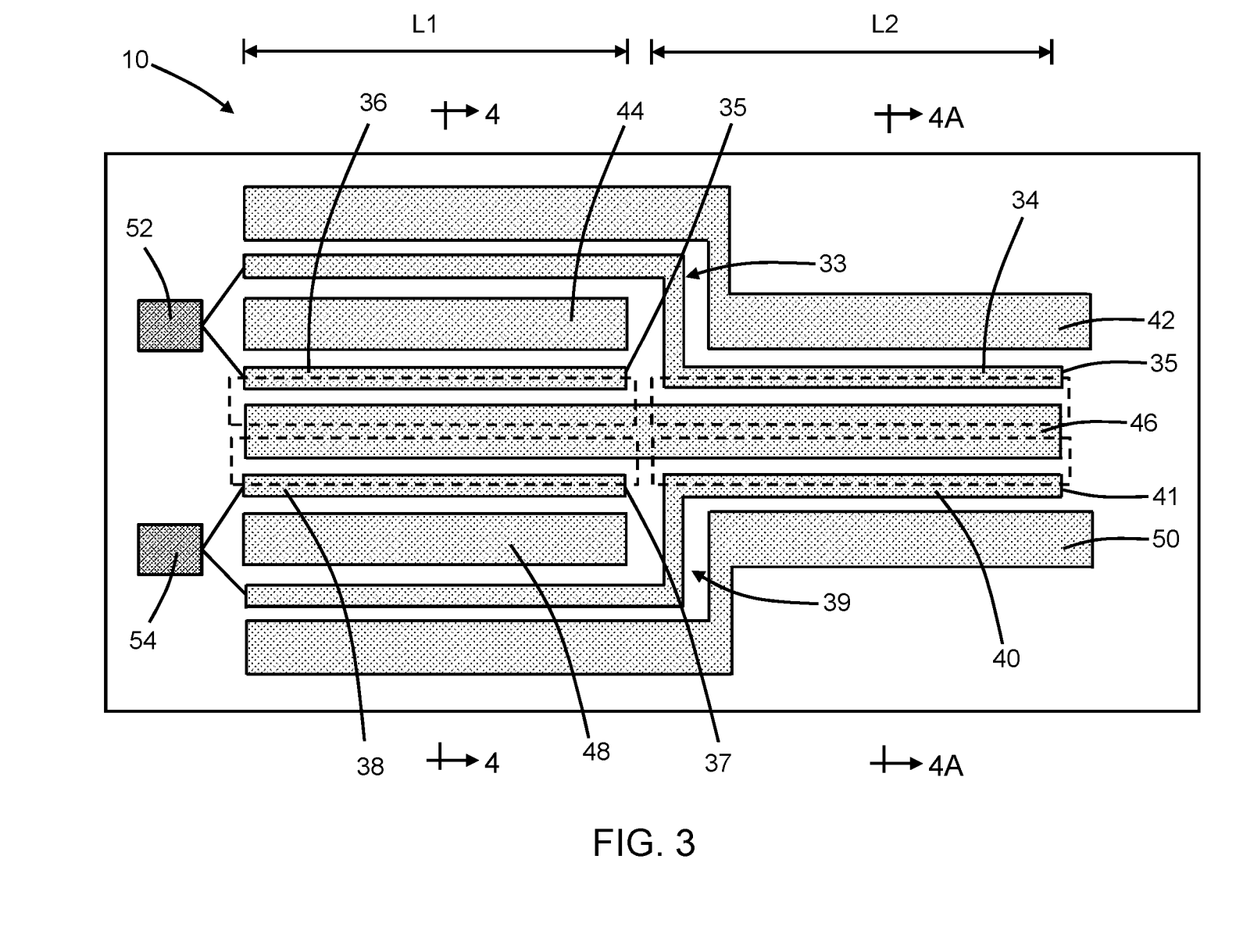
FIG. 3 is a top view of the structure at a fabrication stage subsequent to FIG. 1.
Figure 4:
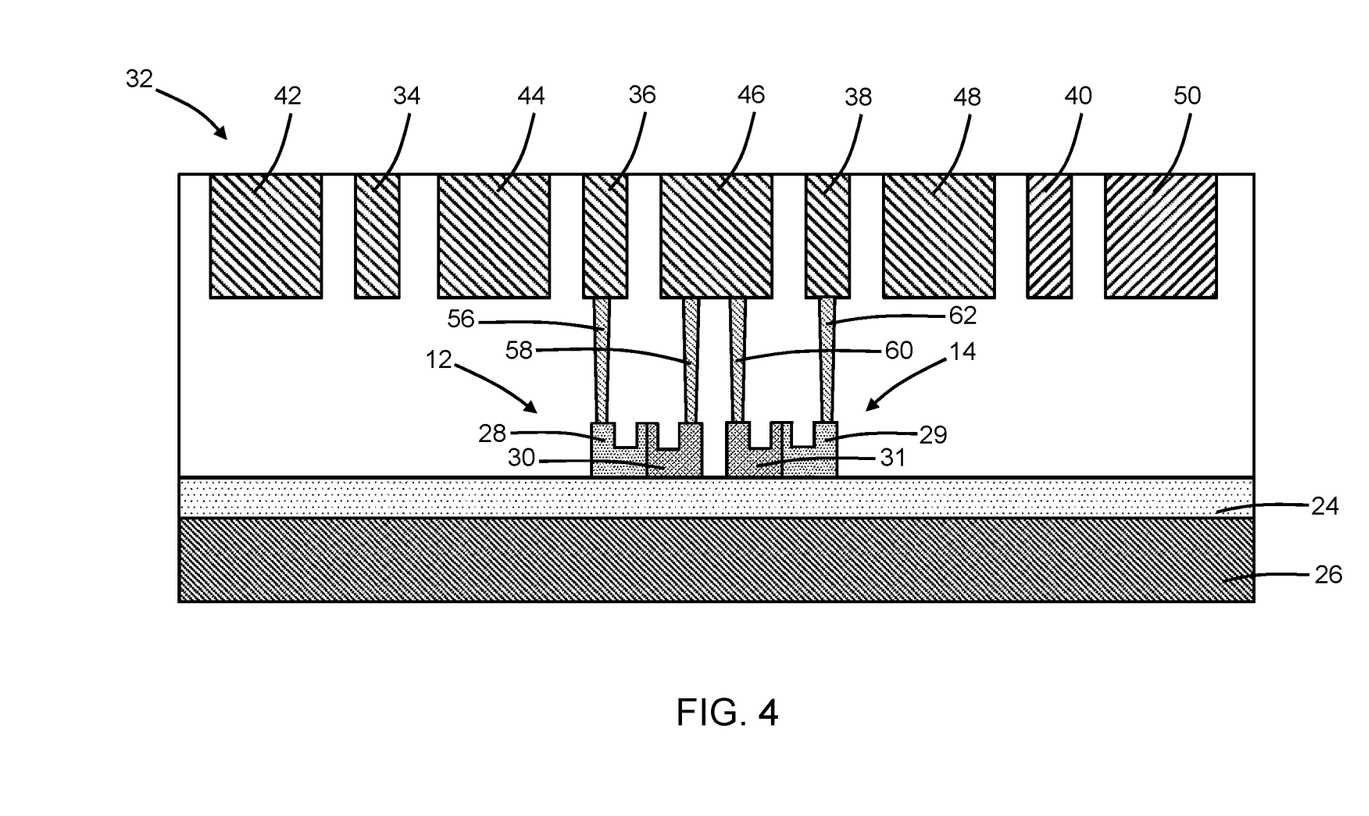
FIG. 4 is a cross-sectional view of the structure taken generally along line 4-4 in FIG. 3.
Figure 4A:
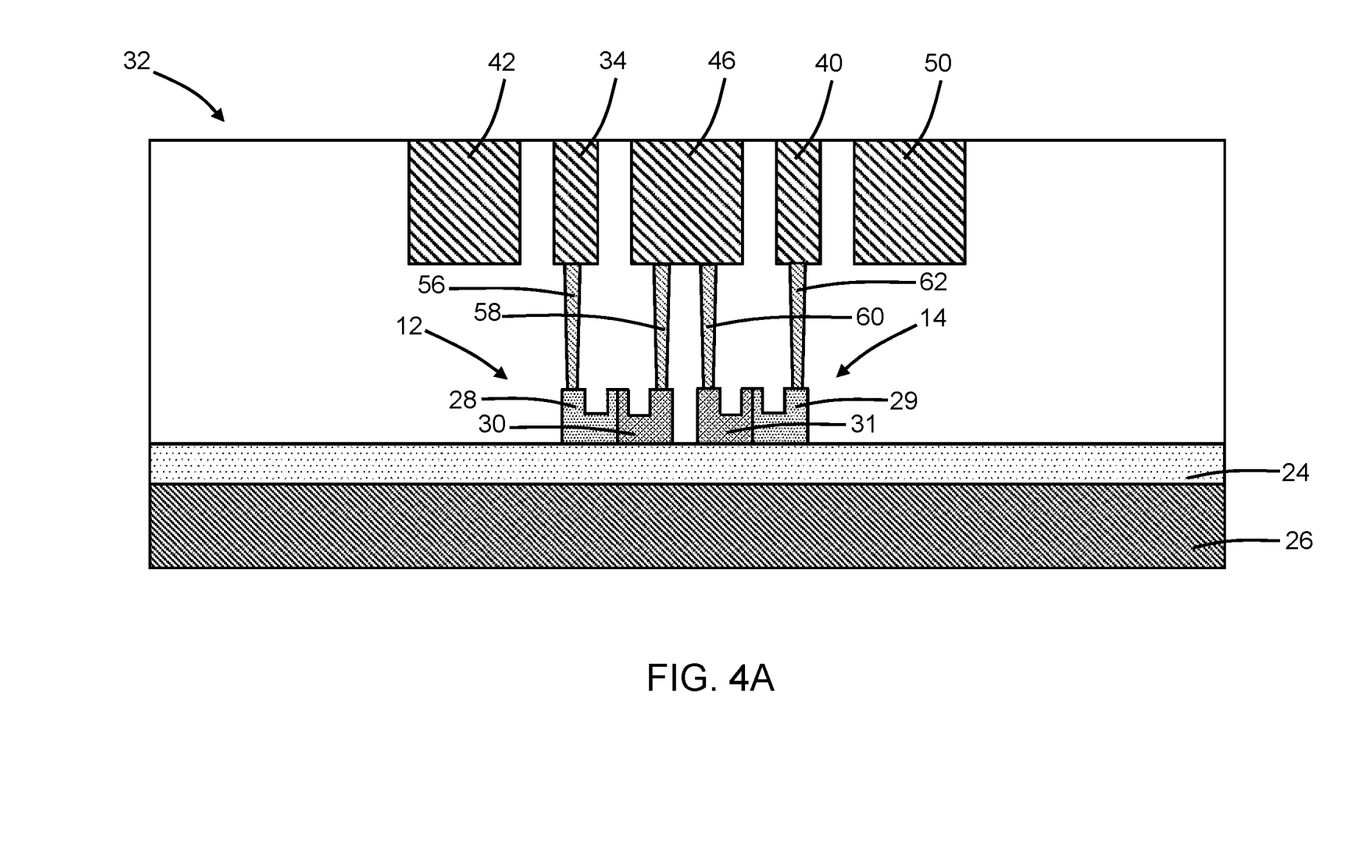
FIG. 4A is a cross-sectional view of the structure taken generally along line 4A-4A in FIG. 3.

With reference to FIGS. 3, 4, 4A in which like reference numerals refer to like features in FIGS. 1, 2 and at a subsequent fabrication stage, an interconnect structure 32 may be formed by middle-of-line and back-end-of-line processing over the waveguide cores 12, 14, the optical splitter 16, the optical combiner 18, the routing waveguide cores 20, 22, and the dielectric layer 24. The interconnect structure 32 may include multiple wiring levels that may be formed by deposition, polishing, lithography, and etching techniques characteristic of a damascene process. Specifically, for each wiring level, an interlayer dielectric layer may be deposited and patterned using lithography and etching processes to define trenches and via openings that are lined with a barrier layer (e.g., a bilayer of tantalum and tantalum nitride) and filled by a planarized conductor (e.g., copper) to define lines and vias that connect the lines in different wiring levels. Each interlayer dielectric layer of the interconnect structure 32 may be comprised of an inorganic dielectric material, such as silicon dioxide or a low-k dielectric material, that is deposited by, for example, chemical vapor deposition.

Transmission lines 34, 36, 38, 40 and transmission lines 42, 44, 46, 48, 50 are included in the interconnect structure 32. In an embodiment, the transmission lines 34, 36, 38, 40, 42, 44, 46, 48, 50 may be positioned in the topmost wiring level of the interconnect structure 32. The vias and lines in multiple wiring levels (simplified for purposes of illustration) provide respective interconnections 56, 58, 60, 62 between the doped regions 28, 30 of the waveguide cores 12, 14 and the transmission lines 34, 36, 38, 40, 42, 44, 46, 48, 50. Although not shown, the multiple intervening wiring levels of the interconnect structure 32 may laterally offset the transmission lines 34, 36, 38, 40, 42, 44, 46, 48, 50 relative to the waveguide cores 12, 14. One or more heaters (not shown) may be provided for tuning the performance of the structure 10. Each of the transmission lines 42, 44, 46, 48, 50 may be coupled to a ground potential, the transmission lines 34, 36 may be coupled to a signal source, and the transmission lines 38, 40 may be coupled to a different signal source.

The transmission lines 34, 36 provide signal electrodes that are coupled in parallel to a driver 52, which is shared by the transmission lines 34, 36. The driver 52 includes components, such as a driver amplifier, that are configured to supply data in the form of radiofrequency signals to the transmission lines 34, 36 for modulating the effective refractive index of the waveguide core 12. Consequently, the transmission line 34 and the transmission line 36 concurrently receive the same signals from the driver 52.

The transmission line 36 is physically coupled by intervening portions of the interconnect structure 32 to the section of the waveguide core 12 having the length L1, and the transmission line 34 is physically coupled by intervening portions of the interconnect structure 32 to the section of the waveguide core 12 having the length L2. The transmission line 34 is not physically connected by interconnections within the interconnect structure 32 to the section of the waveguide core 12 having the length L1, and the transmission line 34 is not physically connected by interconnections within the interconnect structure 32 to the section of the waveguide core 12 having the length L2. The transmission line 46, which is grounded, is coupled through the interconnect structure 32 to the doped region 30 of the waveguide core 12 over length L1 and length L2. The doped region 30 of the waveguide core 12 may define a cathode of the structure 10.

The transmission lines 38, 40 provide signal electrodes that are coupled in parallel to a driver 54, which is shared by the transmission lines 38, 40 and which may be distinct from the driver 52. The driver 54 includes components, such as a driver amplifier, that are configured to supply data in the form of radiofrequency signals to the transmission lines 38, 40 for modulating the effective refractive index of the waveguide core 14. Consequently, the transmission line 38 and the transmission line 40 concurrently receive the same signals from the driver 54.

The transmission line 38 is physically coupled by intervening portions of the interconnect structure 32 to the section of the waveguide core 14 having the length L1, and the transmission line 40 is physically coupled intervening portions of the interconnect structure 32 to the section of the waveguide core 14 having the length L2. The transmission line 40 is not coupled by the interconnect structure 32 to the section of the waveguide core 14 having the length L1, and the transmission line 38 is not coupled by the interconnect structure 32 to the section of the waveguide core 14 having the length L2. The transmission line 46, which is grounded, is coupled through the interconnect structure 32 to the doped region 30 of the waveguide core 14 over length L1 and length L2. The doped region 30 of the waveguide core 14 may define a cathode of the structure 10.

The drivers 52, 54 provide respective signals having a phase difference through the interconnect structure 32 in a coordinated manner to the doped region 28 of the waveguide core 12 and the doped region 29 of the waveguide core 14, which may define anodes of the phase shifter of the structure 10. For example, the phase difference may be about 180 degrees. As a result, the phase modulations of the optical signals guided by the different waveguide cores 12, 14 may have the same absolute values but different signs (e.g., opposite signs). In an alternative embodiment, respective signals with the requisite phase shift may be provided to the doped region 28 of the waveguide core 12 and the doped region 29 of the waveguide core 14 by a single driver.

The transmission lines 36, 38 are located in the structure 10 over a length commensurate with the length L1 and are respectively physically coupled within the interconnect structure 32 to the doped regions 28, 29 in the waveguide cores 12, 14 over the length L1 to provide loading. The transmission line 36 may extend longitudinally parallel to a section of the transmission line 46 and terminate at an end surface 35, and the transmission line 38 may extend longitudinally parallel to a section of the transmission line 46 and terminate at an end surface 37. In that regard, the transmission line 36 is truncated to a length that is equal or substantially equal to the length L1, and transmission line 38 is truncated to a length that is equal or substantially equal to the length L1. A section of the transmission line 46, which is grounded, is laterally positioned between the transmission line 36 and the transmission line 38 over the length L1.

Over the length L1, a section of the transmission line 34 is positioned within the interconnect structure 32 adjacent to the transmission line 36, and the transmission line 44 is positioned within the interconnect structure 32 laterally between the section of the transmission line 34 and transmission line 36. Over the length L1, a section of the transmission line 40 is positioned within the interconnect structure 32 adjacent to the transmission line 38, and the transmission line 48 is positioned within the interconnect structure 32 laterally between the transmission line 38 and the section of the transmission line 40. The transmission line 36 and the transmission line 38 are consequently each laterally arranged between grounded transmission lines over the length L1.

The transmission line 34 is unloaded over the length L1 because the transmission line 34 is not physically connected within the interconnect structure 32 to the doped region 28 of the waveguide core 12 over the length L1. The transmission line 34 has bends 33 providing a change in direction such that the transmission line 34 transversely approaches the transmission line 46 at the transition provided by the waveguide section 17 (FIG. 1) and then turns to be aligned parallel to transmission line 46 over the length L2. After the change in direction, the transmission line 34 may extend longitudinally parallel or substantially parallel to the transmission lines 42, 46 and terminate at an end surface 35. The truncation of the transmission line 36, as well as the truncation of the grounded transmission line 44, frees space in the layout of the structure 10 for the change in direction. The transmission line 42 includes bends providing a similar change in direction such that the transmission line 34 is laterally arranged between grounded transmission lines over both of the lengths L1, L2.

The transmission line 40 is unloaded over the length L1 because the transmission line 40 is not physically connected within the interconnect structure 32 to the doped region 29 of the waveguide core 14 over the length L1. The transmission line 40 has bends 39 providing a change in direction such that the transmission line 40 transversely approaches the transmission line 46 at the transition provided by the waveguide section 19 (FIG. 1) and then turns to be aligned parallel to the transmission line 46 over the length L2. After the change in direction, the transmission line 40 may extend longitudinally parallel or substantially parallel to the transmission lines 46, 50 and terminate at an end surface 41. The truncation of the transmission line 38, as well as the truncation of the grounded transmission line 48, frees space in the layout of the structure 10 for the change in direction. The transmission line 50 includes bends providing a similar change in direction such that the transmission line 40 is laterally arranged between grounded transmission lines over both of the lengths L1, L2.

After the change in direction, the transmission line 34 has a section that is located in the structure 10 over a length commensurate with the length L2. This section of the transmission line 34 is coupled to the doped region 28 of the waveguide core 12 over the length L2 to provide loading. The length of the loaded section of the transmission line 34 is equal or substantially equal to the length L2. The transmission line 40 has a section that is located in the structure 10 over a length commensurate with the length L2. This section of the transmission line 40 is coupled to the doped region 29 of the waveguide core 14 over the length L2 to provide loading. The length of the loaded section of the transmission line 40 is equal or substantially equal to the length L2. A section of the transmission line 46, which is grounded, is laterally positioned between the loaded section of the transmission line 34 and the loaded section of the transmission line 40 over the length L2.

In use, the structure 10 provides an optical interferometer in which the incoming light arriving in the routing waveguide core 20 is split by the optical splitter 16, experiences phase shifts in propagating through the separate paths defined by the waveguide cores 12, 14, and is then recombined by the optical combiner 18. If the phase shift between the two paths is equal to 0°, then there is maximum constructive interference, and the output of optical power is maximized (i.e., ideal logic 1) at the routing waveguide core 22. If the phase shift between the two paths is equal to 180°, then there is maximum destructive interference, and the output of optical power is minimized (i.e., ideal logic 0) at the routing waveguide core 22. The structure 10 changes the relative phase between the two paths with a modulation voltage via the electro-optic effect, producing the modulated output signal at the output. The amount of phase shift generated by the structure 10 is proportional to the radiofrequency voltages applied from the transmission lines 34, 36, 38, 40 and the length of the phase shifter.

The transmission lines 36, 38 of the structure 10 are fully loaded by their connections within the interconnect structure 32 with the phase shifter over a portion of the length of the phase shifter, namely the length L1. The transmission lines 34, 40 of the structure 10 are fully loaded by their connections within the interconnect structure 32 with the phase shifter over another portion of the length of the phase shifter, namely the length L2. The transmission lines 34, 40 of the structure 10 are unloaded (i.e., not loaded) over the length L1, which causes low loss over this portion of the length of the phase shifter. The structure 10, which may be characterized as a traveling wave Mach-Zehnder modulator, may exhibit an extended electro-optic bandwidth due to the shortening of the loaded portions of the transmission lines 34, 36, 38, 40 by segmentation while maintaining a minimized insertion loss (IL) and a maximized extinction ratio (ER). The electro-optic bandwidth of the segmented structure 10 may be extended without compromising the effective length of the structure 10. Because the transmission lines 34, 36 are commonly driven by the driver 52 and the transmission lines 38, 40 are commonly driven by the driver 54, electronic timing circuits are not required to control the timing of the applied electrical signals to match the optical delay between the different sections of the waveguide cores 12, 14.

Figure 5:
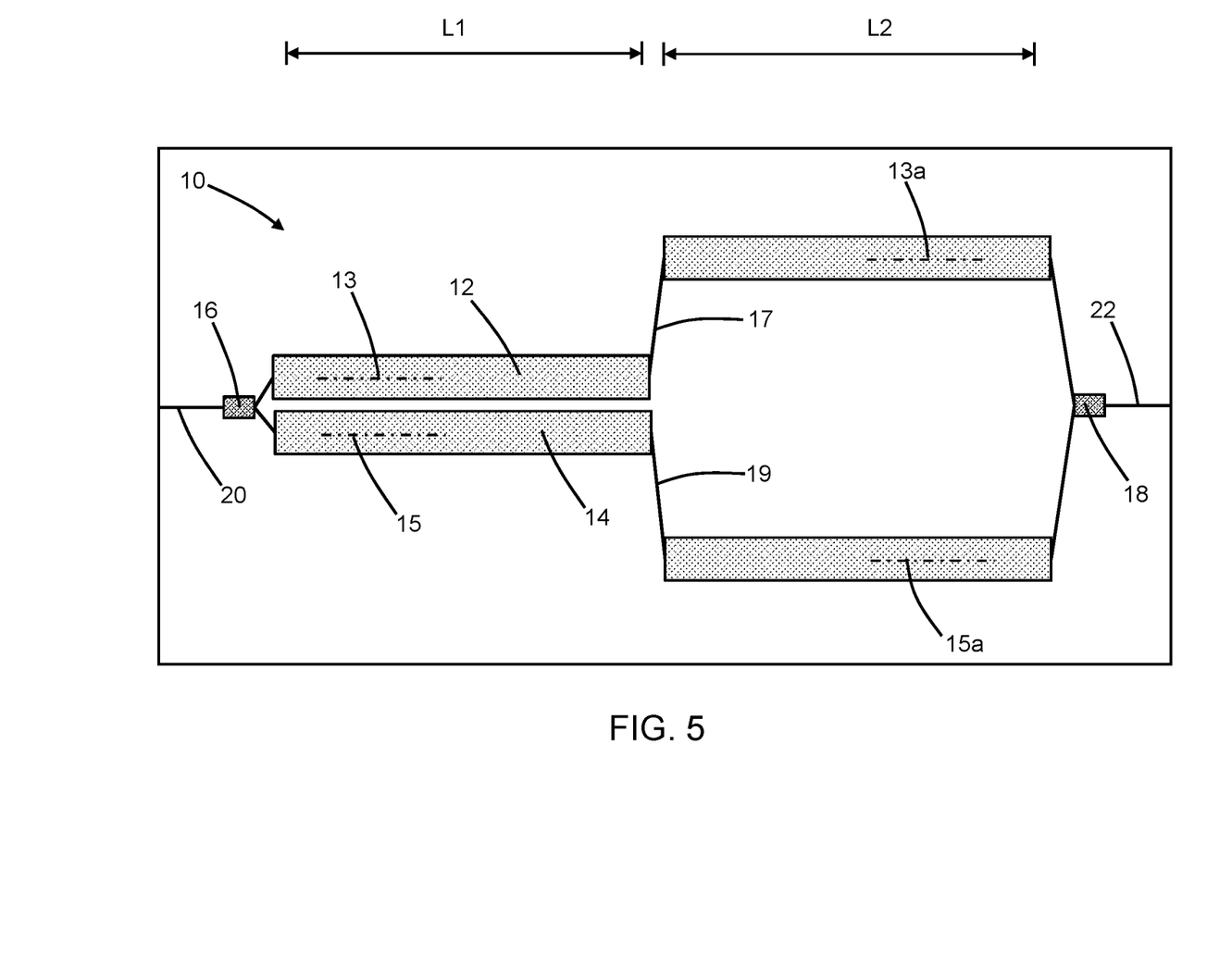
FIG. 5 is a top view of a structure in accordance with alternative embodiments of the invention.
Figure 6:
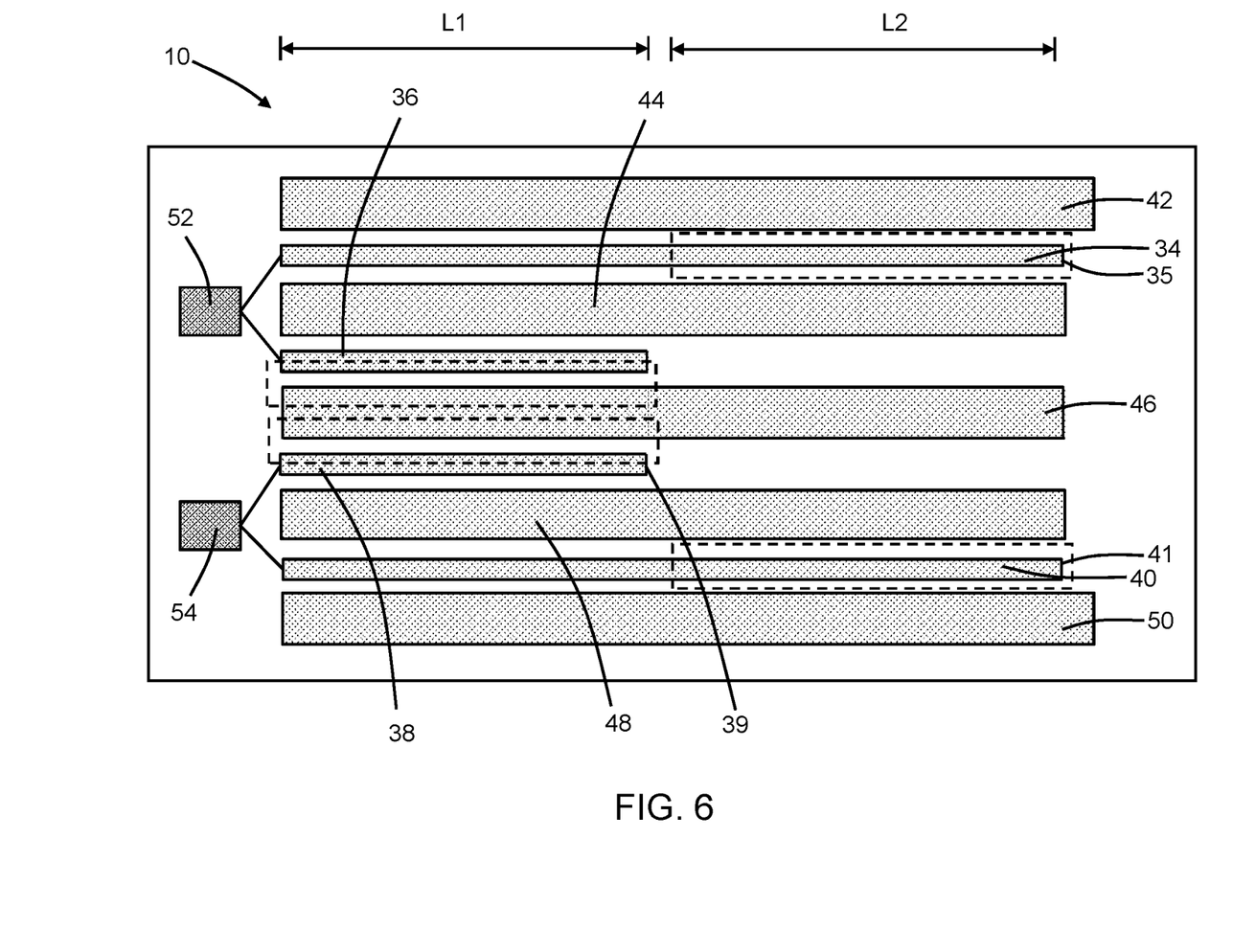
FIG. 6 is a top view of the structure at a fabrication stage subsequent to FIG. 5.

With reference to FIGS. 5, 6 and in accordance with alternative embodiments, the sections of the waveguide core 12 may be laterally offset from each other and the sections of the waveguide core 14 may be laterally offset from each other. The section of the waveguide core 12 having the length L2 is aligned along a longitudinal axis 13a that may be oriented parallel or substantially parallel to the longitudinal axis 13, and the section of the waveguide core 14 having the length L2 is aligned along a longitudinal axis 15a that may be oriented parallel or substantially parallel to the longitudinal axis 15. The section of the waveguide core 12 having the length L1 is aligned along the longitudinal axis 13, which is laterally spaced from the longitudinal axis 13a. The section of the waveguide core 12 having the length L2 is aligned along the longitudinal axis 15, which is laterally spaced from the longitudinal axis 15a.

As a result of the lateral offsets of the sections of the waveguide core 12 provided by the waveguide section 17 (FIG. 1), changes in direction are not necessarily required for the transmission lines 34 and 42. As a result of the lateral offsets of the sections of the waveguide core 14 provided by the waveguide section 19 (FIG. 1), changes in direction are not necessarily required for the transmission lines 40 and 50. The transmission lines 44, 48 may extend over the entire length of the waveguide cores 12, 14 due to the elimination of the changes in direction.

The transmission line 46, which is grounded, is coupled through the interconnect structure 32 to the doped region 30 of the waveguide core 12 over the length L1 and to the doped region 31 of the waveguide core 14 over the length L1. The doped region 30 of the waveguide core 12 may be coupled to either the transmission line 42 or the transmission line 44 over the length L2. The doped region 31 of the waveguide core 14 may be coupled to either the transmission line 48 or the transmission line 50 over the length L2.

Figure 7:
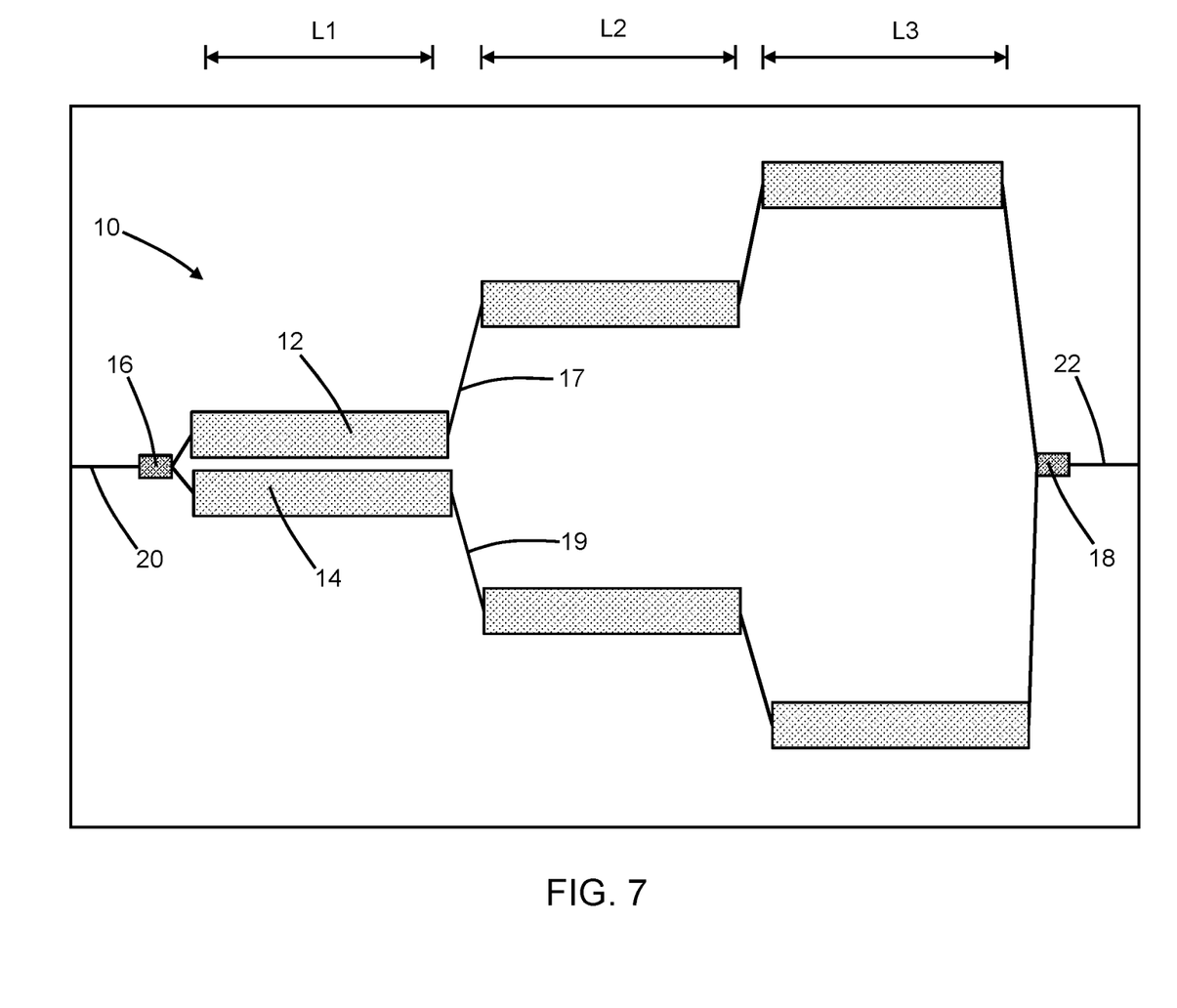
FIG. 7 is a top view of a structure in accordance with alternative embodiments of the invention.
Figure 8:
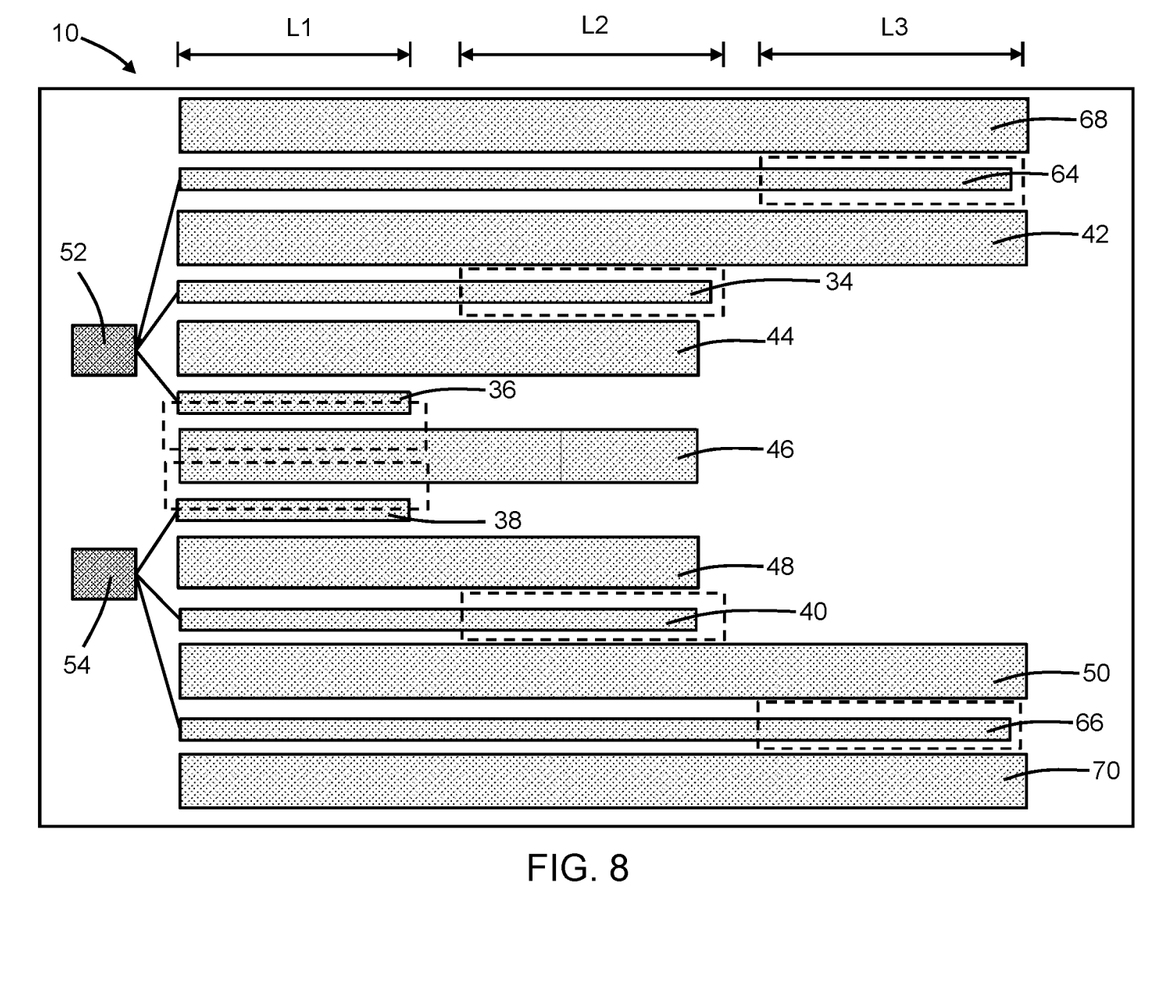
FIG. 8 is a top view of the structure at a fabrication stage subsequent to FIG. 7.

With reference to FIGS. 7, 8 and in accordance with alternative embodiments, the waveguide cores 12, 14 may be divided into multiple sections that are laterally offset from each other. Each of the waveguide cores 12, 14 may be further divided into more than a pair of sections. For example, each the waveguide cores 12, 14 may be further divided to add a section characterized by a length L3 such that an approximate total length of the waveguide cores 12, 14 is equal to a sum of the lengths L1, L2, L3. In an embodiment, the length L3 may be equal to the length L1, and the length L3 may be equal to the length L2. In an embodiment, the length L3 may be substantially equal to the length L1, and the length L3 may be substantially equal to the length L2. In an embodiment, the length L1, the length L2, and the length L3 may each be equal to 0.6 millimeters.

Transmission lines 64, 66 similar to transmission lines 34, 36, 38, 40 and transmission lines 68, 70 similar to transmission lines 42, 44, 46, 48, 50 are included in the interconnect structure 32 to accommodate the added sections of the waveguide cores 12, 14. The transmission lines 68, 70 may be coupled to a ground potential.

The transmission line 64 provides a signal electrode that is coupled in parallel to the driver 52 along with the transmission lines 34, 36. Consequently, the transmission lines 34, 36, 64 concurrently receive the same signals from the driver 52. The transmission line 64 is physically coupled by intervening portions of the interconnect structure 32 to the doped region 28 in the section of the waveguide core 12 over the length L3. The transmission line 64 is not coupled to the doped region 28 in the section of the waveguide core 12 over the length L1 nor to the doped region 28 in the section of the waveguide core 12 over the length L2.

The transmission line 66 provides a signal electrode that is coupled in parallel to the driver 54 along with the transmission lines 38, 40. Consequently, the transmission lines 38, 40, 66 concurrently receive the same signals from the driver 54. The transmission line 66 is physically coupled by intervening portions of the interconnect structure 32 to the doped region 29 in the section of the waveguide core 14 over the length L3. The transmission line 66 is not coupled to the doped region 29 in the section of the waveguide core 14 having the length L1 nor to the section of the waveguide core 14 having the length L2.

The transmission line 64 is coupled to the doped region 28 in the waveguide core 12 over the length L3 to provide loading. The transmission line 66 is coupled to the doped region 29 in the waveguide core 14 over the length L3 to provide loading. Portions of the transmission lines 42 and 68, which are grounded, are laterally positioned adjacent to the transmission line 64 over its entire length. Portions of the transmission lines 50 and 70, which are grounded, are laterally positioned adjacent to the transmission line 66 over its entire length.

The transmission lines 64, 66 are unloaded over the lengths L1 and L2 due to an absence of connections to doped regions 28, 29 in the waveguide cores 12, 14. The length of the loaded portion of the transmission line 64 is equal or substantially equal to the length L3 of the corresponding section of the waveguide core 12, and the length of the loaded portion of the transmission line 66 is equal or substantially equal to the length L3 of the corresponding section of the waveguide core 14.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical power modulator, the structure comprising:
    a first waveguide core including a first section and a second section;
    a second waveguide core including a first section laterally adjacent to the first section of the first waveguide core and a second section laterally adjacent to the second section of the first waveguide core;
    an interconnect structure over the first waveguide core and the second waveguide core, the interconnect structure including a first transmission line, a second transmission line, a third transmission line, and a fourth transmission line, the first transmission line physically connected to the first section of the first waveguide core, the third transmission line physically connected to the first section of the second waveguide core, the second transmission line including a first section physically connected to the second section of the first waveguide core and a second section adjacent to the first transmission line, and the fourth transmission line includes a first section physically connected to the second section of the second waveguide core and a second section adjacent to the third transmission line;
    a first driver coupled in parallel to the first transmission line and the second transmission line; and
    a second driver coupled in parallel to the third transmission line and the fourth transmission line.

2. The structure of claim 1 wherein the first transmission line is not physically connected within the interconnect structure to the second section of the first waveguide core.

3. The structure of claim 1 wherein the second transmission line is not physically connected within the interconnect structure to the first section of the first waveguide core.

4. The structure of claim 1 wherein the first transmission line has an end surface proximate to a transition from the first section of the second transmission line to the second section of the second transmission line.

5. The structure of claim 1 wherein the first section of the first waveguide core has a first length, and the second section of the first waveguide core has a second length that is equal to the first length.

6. The structure of claim 1 further comprising:
    a first grounded transmission line laterally positioned between the second section of the second transmission line and the first transmission line.

7. The structure of claim 6 further comprising:
    a second grounded transmission line laterally positioned between the second section of the fourth transmission line and the third transmission line.

8. The structure of claim 1 wherein the second section of the first waveguide core is laterally offset from the first section of the first waveguide core.

9. The structure of claim 1 wherein the first section of the second transmission line is spaced from the second section of the first waveguide core by a first distance, and the second section of the second transmission line is spaced from the first section of the first waveguide core by a second distance that is greater than the first distance.

10. The structure of claim 9 wherein the second transmission line includes a bend between the first section and the second section of the second transmission line.

11. The structure of claim 1 wherein the first waveguide core has a first doped region and a second doped region that adjoins the first doped region along a p-n junction, the first transmission line is physically connected to the first doped region in the first section of the first waveguide core, and the second section of the second transmission line is physically connected to the first doped region in the second section of the first waveguide core.

12. The structure of claim 11 wherein the interconnect structure includes a first interconnection that physically connects the first transmission line to the first doped region in the first section of the first waveguide core, and the interconnect structure includes a second interconnection that physically connects the second transmission line to the first doped region in the second section of the first waveguide core.

13. The structure of claim 1 further comprising:
    a grounded transmission line laterally positioned between the second section of the second transmission line and the second section of the fourth transmission line.

14. The structure of claim 13 wherein the second section of the second transmission line and the second section of the fourth transmission line are aligned parallel to the grounded transmission line.

15. The structure of claim 1 further comprising:
a grounded transmission line laterally positioned between the first transmission line and the third transmission line.

16. A method of forming a structure for an optical power modulator, the method comprising:
forming a first waveguide core including a first section and a second section;
forming a second waveguide core including a first section laterally adjacent to the first section of the first waveguide core and a second section laterally adjacent to the second section of the first waveguide core;
forming an interconnect structure over the first waveguide core and the second waveguide core, wherein the interconnect structure includes a first transmission line, a second transmission line, a third transmission line, and a fourth transmission line, the first transmission line is physically connected to the first section of the first waveguide core, the third transmission line is physically connected to the first section of the second waveguide core, the second transmission line includes a first section physically connected to the second section of the first waveguide core and a second section adjacent to the first transmission line, and the fourth transmission line includes a first section physically connected to the second section of the second waveguide core and a second section adjacent to the third transmission line;
coupling a first driver in parallel to the first transmission line and the second transmission line; and
coupling a second driver in parallel to the third transmission line and the fourth transmission line.

17. The method of claim 16 wherein the first transmission line is not physically connected within the interconnect structure to the second section of the first waveguide core.

18. The method of claim 16 wherein the second transmission line is not physically connected within the interconnect structure to the first section of the first waveguide core.

* * * * *